United States Patent
vor dem Brocke et al.

(10) Patent No.: US 10,133,241 B2
(45) Date of Patent: Nov. 20, 2018

(54) METHOD FOR CONTROLLING A CONTROL LOOP HAVING A STANDARDIZED SELECTION VARIABLE

(71) Applicant: TRUMPF Huettinger GmbH + Co. KG, Freiburg (DE)

(72) Inventors: Manuel vor dem Brocke, Freiburg (DE); Sebastian Fecker, Freiburg (DE); Christian Bock, Freiburg (DE)

(73) Assignee: TRUMPF Huettinger GmbH + Co. KG, Freiburg (DE)

(*) Notice: Subject to any disclaimer, the term of this patent is extended or adjusted under 35 U.S.C. 154(b) by 396 days.

(21) Appl. No.: 14/874,577

(22) Filed: Oct. 5, 2015

(65) Prior Publication Data
US 2016/0026158 A1 Jan. 28, 2016

Related U.S. Application Data
(63) Continuation of application No. PCT/EP2014/056697, filed on Apr. 3, 2014.

(30) Foreign Application Priority Data

Apr. 4, 2013 (DE) .......................... 10 2013 205 936

(51) Int. Cl.
*G05B 5/01* (2006.01)
*G05B 11/42* (2006.01)

(52) U.S. Cl.
CPC ................ *G05B 5/01* (2013.01); *G05B 11/42* (2013.01)

(58) Field of Classification Search
CPC .................................. G05B 11/42; G05B 5/01
See application file for complete search history.

(56) References Cited

U.S. PATENT DOCUMENTS

| | | | | |
|---|---|---|---|---|
| 5,267,262 A | * | 11/1993 | Wheatley, III | H04W 52/06 340/7.33 |
| 6,023,612 A | * | 2/2000 | Harris | H01P 1/2138 330/295 |
| 6,119,063 A | | 9/2000 | Hieb et al. | |
| 6,313,584 B1 | * | 11/2001 | Johnson | H01J 37/32082 315/111.21 |

(Continued)

OTHER PUBLICATIONS

Graf et al., "A New Structure for Cascade Control", English Abstract, Automatisierungstechnik, 51, 2003, 6 pages.
(Continued)

*Primary Examiner* — Kenneth M Lo
*Assistant Examiner* — Chad G Erdman
(74) *Attorney, Agent, or Firm* — Fish & Richardson P.C.

(57) ABSTRACT

Various methods and systems control the power of a process power supply by a control circuit with a controller and several control channels, wherein each control channel comprises an actual value and a target value of a control variable. The systems and methods specify target values of the control variables, determine the actual values of the control variables, determine a selected control channel with the assistance of a selection variable dependent upon the actual value, determine a selected control difference from the target value and the actual value of the selected control channel, and control the control loop with the selected control difference of the selected control channel.

22 Claims, 7 Drawing Sheets

(56) References Cited

U.S. PATENT DOCUMENTS

| | | | | |
|---|---|---|---|---|
| 6,488,807 | B1* | 12/2002 | Collins | C23C 16/507 |
| | | | | 118/723 I |
| 7,206,210 | B2* | 4/2007 | Harnett | H02M 1/32 |
| | | | | 363/80 |
| 2004/0035529 | A1* | 2/2004 | Grimbergen | H01J 37/32935 |
| | | | | 156/345.24 |
| 2004/0175012 | A1* | 9/2004 | Roeck | H04R 25/505 |
| | | | | 381/317 |
| 2005/0255809 | A1* | 11/2005 | Glueck | H03F 1/0211 |
| | | | | 455/69 |
| 2010/0270141 | A1* | 10/2010 | Carter | H01J 37/32935 |
| | | | | 204/164 |
| 2011/0021237 | A1* | 1/2011 | He | H04W 52/367 |
| | | | | 455/522 |
| 2011/0032047 | A1* | 2/2011 | Yuzurihara | H01J 37/32082 |
| | | | | 332/108 |
| 2012/0117011 | A1* | 5/2012 | Hashimoto | F02D 13/0226 |
| | | | | 706/23 |
| 2015/0084509 | A1* | 3/2015 | Yuzurihara | H01J 37/32082 |
| | | | | 315/111.21 |

OTHER PUBLICATIONS

International Search Report from corresponding PCT Application No. PCT/EP2014/056697, dated Jul. 21, 2014, 4 pages.

* cited by examiner

Fig. 5

METHOD FOR CONTROLLING A CONTROL LOOP HAVING A STANDARDIZED SELECTION VARIABLE

CROSS-REFERENCE TO RELATED APPLICATIONS

This application is a continuation of and claims priority under 35 U.S.C. § 120 to PCT Application No. PCT/EP2014/056697 filed on Apr. 3, 2014, which claimed priority to German Application No. DE 10 2013 205 936.1, filed on Apr. 4, 2013. The contents of both of these priority applications are hereby incorporated by reference in their entirety.

TECHNICAL FIELD

The invention relates to systems and methods for controlling a control loop.

BACKGROUND

During operation of a process power supply, various limit values, (for example, for current, voltage, power), are monitored in order to promote secure and optimal operation. For instance, target values for a forward power, a reverse power and a power at load are specified in the case of a power control of a process power supply. In order to ensure that the corresponding target values are not exceeded, the corresponding variables are controlled by varying an adjustment value by means of a control circuit, in such a manner that, as far as possible, all of the target values are undercut by the actual values. For this purpose, the control difference (a difference between target value and actual value) is formed for every channel. A channel selection selects a control channel as the active channel. The control channel selected as the active channel provides the control difference for input into the downstream controller. The adjustment value is then varied by the downstream controller in such a manner that the control difference of the active channel is minimized. Selection of the active control channel is implemented on the basis of the previously determined control difference.

U.S. Pat. No. 7,206,210 discloses 4 selecting a control channel that comprises the smallest or respectively the largest control difference (error signal). However, selecting the control channel with the largest control difference is extremely risky because the target values are routinely exceeded. Outside of the framework of settling time, selecting the largest control difference should generally be avoided.

Accordingly, it is therefore conventional to select the control channel having the smallest control difference as the basis for controlling a control loop. However, if an actual value of one of the control channels overshoots a target value, the control is implemented on the control channel on which the actual value has overshot the target value, because the associated control difference is negative and is therefore the smallest control difference. The overshooting of the target value is therefore corrected again in the next control step. By contrast, if the control channel with the largest control difference were to be selected as the active channel, the overshooting of the target value would continue to be ignored.

However, there are systems in which two target values are disposed very far apart. For example, in the case of a power control of a process power supply, the target values of the forward power and the reverse power are often disposed far apart. With the method known from the prior art, the control is often implemented, in such cases, over a long duration of the settling time, exclusively on the smallest target value, because its absolute control difference over the entire settling time is also the smallest. However, as a consequence, this has a long settling time (the time which the system requires in order to increase the output power from 10% of the adjusted target value to 90% of the adjusted target value), because the smaller the control difference for the control itself, the longer the settling time will be.

SUMMARY

Various embodiments disclosed herein provide a method for controlling the power of a process power supply by a control circuit with a controller and several control channels, wherein each control channel comprises an actual value and a target value of a control variable, with the following method steps:

specifying the target values of the control variables;
determining the actual values of the control variables;
determining a selected control channel, wherein the selected control channel is determined with the assistance of a selection variable dependent upon the actual value;
determining a selected control difference from the target value and the actual value of the selected control channel; and
controlling the control loop with the selected control difference of the selected control channel.

Accordingly, various embodiments disclosed herein provide a control method which, on the one hand, largely avoids an overshooting of a target value and, on the other hand, allows a reduced settling time.

Embodiments disclosed herein provide such a control method by normalizing the selection variable for at least one of the control channels to the target value of the corresponding control channel to form a normalized selection variable and by determining the selected control channel on the basis of a comparison of the normalized selection variable with at least one further similar variable.

The corresponding normalized selection variable is formed for at least one target-value–actual-value pair (=control channel). This normalized selection variable is compared with a further variable. This can be an arbitrary similar variable, wherein, "similar variable" is understood to mean a variable of a suitable type to be compared with the normalized selection variable, that is, in particular, to provide the same unit of measurement and to describe the same type of variable. This can be, for example, a specified variable, a determined variable, especially a variable determined from one of the other control channels. The control of the control loop is finally implemented by applying the control difference of the active channel (selected control channel) to the input of the downstream control algorithm (for example, of a PI controller).

As a result of the method according to various embodiments of the invention, the problem of the relatively slower settling in the case of a specification of a small target value is avoided, because the small target value is not the absolute control difference used for the selection of the active channel. Rather, various embodiments of the invention use a selection variable normalized to the target value, and accordingly, the control channel with the smallest control difference (and therefore the longest settling time) is not necessarily selected as the active channel. The normalized output variable used for the selection of the active channel indicates the relationship in which the selection variable stands relative to a variable dependent upon the target value, for example, the target value itself. By normalizing the selection variable to the respective target value, implementations disclosed herein shorten the settling time and, at the same time, avoid an overshooting of a target value.

In certain implementations, the further similar variable is the normalized selection variable of one of the other control channels.

The normalization may be implemented by dividing the selection variable by the target value of the corresponding control channel. The normalized selection variable therefore indicates the proportion of the selection variable relative to the target value.

With one particular variant of the method, the normalized selection variable is determined for at least two control channels, and may be determined for all control channels, and the control channel with the maximal or minimal normalized selection variable is determined as the selected channel. In this case, the further similar variable is therefore the normalized selection variable of another control channel, wherein the normalized selection variable of the other control channel is normalized to the target value of the corresponding (other) control channel. Accordingly, a comparison is implemented between the normalized selection variables of at least two control channels. The normalized selection variables of the different control channels are supplied to a minimum-finder (or maximum-finder), which determines the smallest (or respectively largest) normalized selection variable and generates a signal for selection of the corresponding control channel. The decision regarding whether the maximum or the minimum of the normalized selection value is determined depends upon the type of selection variable. In this context, it is decisive that none of the upper limits of the control variables should be exceeded. For example, if the selection variable is negative in proportion to the actual value (negative proportionality factor), the minimal normalized selection variable is determined; in the case of a positive proportionality (positive proportionality factor), the maximal normalized selection variable is determined. Non-linear relationships between the selection variable and the actual value are also conceivable.

The normalization can also be implemented by dividing the selection variable by a target value of another control channel. For example, the normalization can be implemented by dividing all selection variables by a single target value.

For example, the control difference can serve as the selection variable. Determination of the selected control channel then takes place by determining the smallest normalized control difference. An equivalent variant provides for the use of the actual value as the selection variable, and the determination of the selected control channel is implemented by determining the largest normalized actual value. Common to both cases is the fact that the maximum of the normalized actual value is sought, because the following applies: (target value−actual value)/target value=1−(actual value/target value) [(SW−IW)/SW=1−(IW/SW)], and accordingly, the maximum of the normalized actual value corresponds to the minimum of the normalized control difference.

With one particular variant of the method, the forward power, the reverse power and the power delivered to a load of a process power supply serve as control variables. Voltages may be measured in order to determine the actual values of the control variables, and the power values are calculated from these.

It is particularly advantageous if a Field Programmable Gate Array (FPGA) is used as the controller. With the use of a FPGA, the algorithms can be accelerated as a result of the parallelism, which is possible with the FPGA. This acceleration can be used in order to increase the sampling rate of the controller or to use more complex algorithms in order to improve the controller.

As an alternative, a digital signal processor can also be used as the controller for this purpose.

All control variables may be influenced via the single adjustment value.

Different matched controller amplifications can be provided for different control channels, wherein the matched controller amplifications for the individual control channels are selected in such a manner that the channels provide the same settling time. For example, in the case of a process power supply, the forward power, the power at load and the reverse power (reflected power, for example, as a result of an error matching) are all influenced by the forward power. This behavior is determined by the control loop, that is, for example, the process power supply and the connected load. The forward power is the variable which is directly influenced by the adjustment value. All other variables are similarly influenced by the adjustment value, but especially also by other influences, for example, the unpredictable behavior of the load. The controller amplification describes the proportionality factor between the control difference, especially of the selected control difference, and the adjustment value. In this context, the proportionality factor can also comprise time-dependent factors (for example, in the case of a PI-, PD- or PID-controller). However, the variation of the reverse power or the power at load generally takes place by a reduced amount compared with the variation of the forward power, because only a part of the forward power is reflected as reverse power. Increasing the reflected power by a fixed amount, takes longer (without matching of the controller amplification) than increasing the forward power by the same amount. To achieve an identical or at least approximately identical behavior of the control circuit for every control channel, the controller amplification is therefore matched, according to an embodiment of the invention, individually to the corresponding active channel.

A matching of the time behavior of the selected control channel to the control channel of the control variable capable of being directly influenced can be achieved by influencing, especially multiplying the controller amplification of the selected channel by an amplification factor. Alternatively or additionally, the selected control difference and/or the adjustment value can also be influenced, especially multiplied, by an amplification factor.

The amplification factor can be determined by dividing the actual value of a first control variable by the actual value of a further control variable, especially the control variable of the selected control channel. In this context, the first control variable can be, in particular, the control variable of which the actual value is influenced directly by the adjustment value. This division can be implemented for all control channels, and is implemented especially when the corresponding control channel is the selected control channel. The controller amplification is therefore adjusted in an adaptive manner corresponding to the amplification factor for each control channel. In this manner, different amplification factors are determined for different control channels, and accordingly, the controller amplification is matched.

A further matched amplification factor can be approximated.

The measurement of the actual values and determination of at least one of the amplification factors can take place continuously. In the present context, "continuous measurement" means that measurements are implemented at regular (short) intervals (sampling time). The length of the sampling time is dependent upon the control circuit and it is significantly shorter, that is, shorter by more than a factor of two, than all other relevant times in the control circuit.

The invention also relates to a control circuit comprising a control loop, especially for controlling the power of a process power supply, with several control channels, wherein each control channel comprises an actual value and a target value of a control variable, and an evaluation device, characterized in that the method according to any one of the preceding embodiments is at least partially implemented in the evaluation device.

Each control channel can provide an adding element which is designed to determine a control difference from the actual value and target value of the control channel. Each control channel can provide a dividing element which is designed to determine a normalized control difference from the actual value and target value of the control channel. The control circuit can provide a comparison device which is designed to determine a control channel as the selected control channel by comparing several normalized control differences. The comparison device can be designed to drive a multiplexer device which, for its part, is designed to supply the control difference of the selected control channel to a controller. Furthermore, the control circuit can provide a dividing element which is designed to determine an amplification factor from two actual values by division. Furthermore, the control circuit can provide a multiplication element which is designed to multiply the amplification factor by an adjustment value determined by the controller and/or by a control difference, especially the selected control difference.

Further advantages of the invention are disclosed in the description and the drawings. Similarly, the features named above and specified below can be used separately or together in arbitrary combinations. The embodiments illustrated and described should not be understood as an exclusive list but are, on the contrary, exemplary in character in order to illustrate the invention.

DETAILED DESCRIPTION

Figure 1:
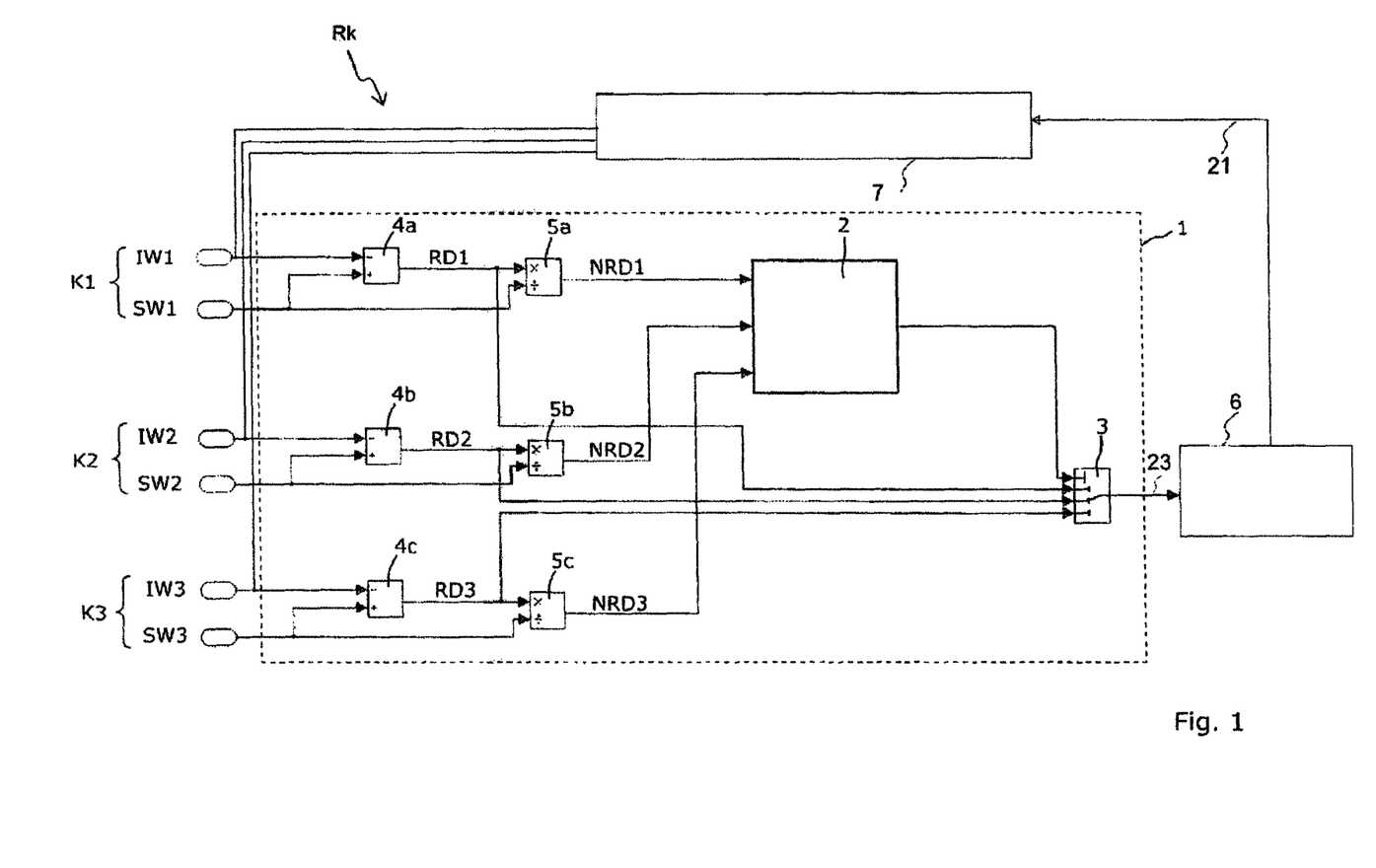
FIG. 1 is a detail of a control circuit according to an embodiment of the invention with a channel selection region in which a selection of the active control channel is made via a normalized selection variable.

FIG. 1 shows a control circuit RK according to an embodiment of the invention with three control channels K1, K2, K3, in each case with an actual value IW1, IW2, IW3 and in each case with a specified target value SW1, SW2, SW3 of a control variable. The control circuit RK comprises a controller 6, a control loop 7 and a channel selection region 1, in which the determination of the selected control channel is implemented. The various control variables are controlled via an adjustment value 21. For this purpose, a control difference RD1, RD2, RD3 (difference between target value and actual value: RD1=SW1−IW1, RD2=SW2−IW2, RD3=SW3−IW3) is determined for every control channel K1, K2, K3. The control is implemented in each case in such a manner that the actual value of the control variable at the output should be substantially limited to the target value. Since only an actual value of a control variable is generated directly by the control loop 7, while the other control variables result from the latter, for example, during operation on a load, the control should be implemented in such a manner that all specified target values SW1, SW2, SW3 apply as an upper limit. With the use of a comparison device 2, one of the control channels K1, K2, K3 is selected as the active channel (here the second control channel K2), of which the control difference (here the control difference RD2) is applied by the control difference multiplexer 3 as the so-called selected control difference 23, to the input of the downstream controller 6 (for example an PI controller). The controller 6 calculates the adjustment value 21. This influences the control loop 7. The three actual values IW1, IW2 and IW3, all of which are influenced by the adjustment value 21, are determined in the control loop 7.

In the case of the method according to an embodiment of the invention, the selection of the active channel takes place by comparing a normalized selection variable with at least one similar variable. In the present example, the control difference RD1, RD2, RD3, which is determined in each case via an adding element 4a, 4b, 4c is used as the selection variable. This control difference RD1, RD2, RD3 is normalized, by means of a dividing element 5a, 5b, 5c, to the respective target value SW1, SW2, SW3, by dividing the control difference RD1, RD2, RD3 by the associated target value SW1, SW2, SW3. In the present case, this is implemented for every control channel K1, K2, K3, so that a normalized control difference NRD1, NRD2, NRD3 is obtained for every control channel K1, K2, K3. The normalized selection variables in this example are the normalized control differences NRD1, NRD2, NRD3.

In the illustrated variant of the method according to an embodiment of the invention, the normalized control differences NRD2, NRD3 of the other control channels K2, K3 are used as the similar value with which the normalized control difference NRD1 of the first control channel K1 is compared. This applies in a corresponding manner for each of the control channels K1, K2, K3.

The comparison device 2 determines the minimal normalized control difference NRD2 and causes the multiplexer device 3 to activate the corresponding control channel K2.

Instead of the normalized control difference, the normalized actual value can also serve as the selection variable. The comparison device would then determine the control channel with the maximal normalized actual value in order to select this as the active channel.

Through the comparison of normalized control differences NRD1, NRD2, NRD3, the settling time can be shortened, because it is the relative and not the absolute deviation of the actual values IW1, IW2, IW3 from the corresponding target values SW1, SW2, SW3 of the control channels K1, K2, K3 which is decisive here, and a control channel with a large absolute control difference therefore also comes into consideration as an active channel.

Figure 2:
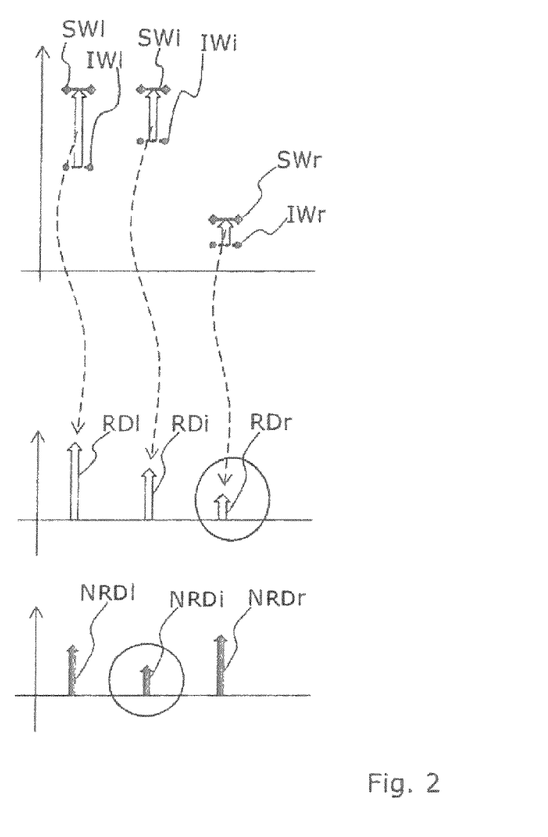
FIG. 2 is a schematic illustration of target values, actual values, control differences and normalized control differences of three control channels.

FIG. 2 shows graphically how target values SWl, SWi, SWr, actual values IWl, IWi, IWr, control differences RDl, RDi, RDr and normalized control differences NRDl, NRDi, NRDr of forward power Pi, power at load Pl and reverse power Pr of a process power supply relate to one another. Table 1 lists the corresponding values for the forward power Pi and the reverse power Pr. It is evident that the control channel of the forward power Pi in fact provides the smallest absolute control difference, but the control channel of the reverse power Pr provides the smallest normalized control difference. While, according to the method known from the prior art (channel selection on the basis of minimal absolute control difference), the control is implemented on the control variable reverse power Pr with the smallest target value and the smallest control difference, the method according to the invention provides for the control of the forward voltage Pi (minimal normalized control difference or respectively maximal normalized actual value), which is associated, because of the larger absolute control difference, with a settling time shorter, for example, by a factor 2.5 to 10, however, without allowing the risk of the target values overshooting.

TABLE 1

|  | Pr | Pi |
|---|---|---|
| Target value (SW) | 200 W | 1000 W |
| Actual value (IW) | 100 W | 700 W |
| Control difference (RD) | 100 W | 300 W |
| Normalized control difference (NRD) | 50% | 30% |
| Normalized actual value (NIW) | 50% | 70% |
| Selection of control channel according to RD absolute (prior art) | X |  |
| Selection of control channel according to normalized control difference |  | X |
| Selection of control channel according to normalized actual value |  | X |

If the normalized control differences are identical (for example, at the time of switching on, if the normalized control difference in all channels is 100%), a standard control channel can be specified. As an alternative, the control channel with the smallest absolute control difference can also be selected in this case.

Figure 3A:
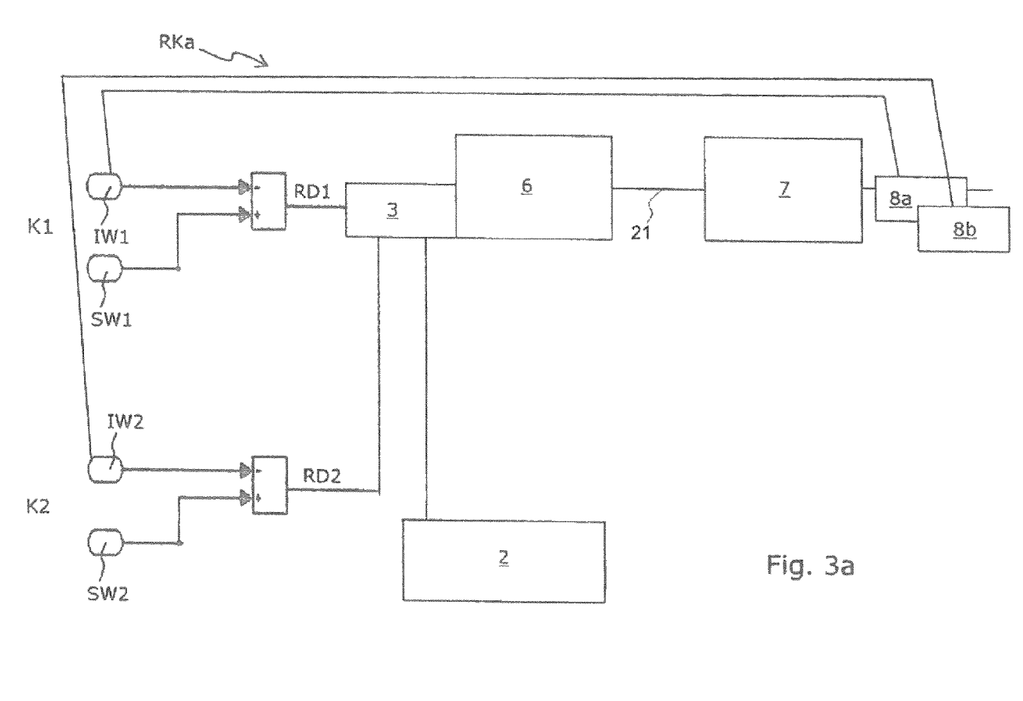
FIG. 3a is a control circuit with two control channels without adaptive amplification.
Figure 3B:
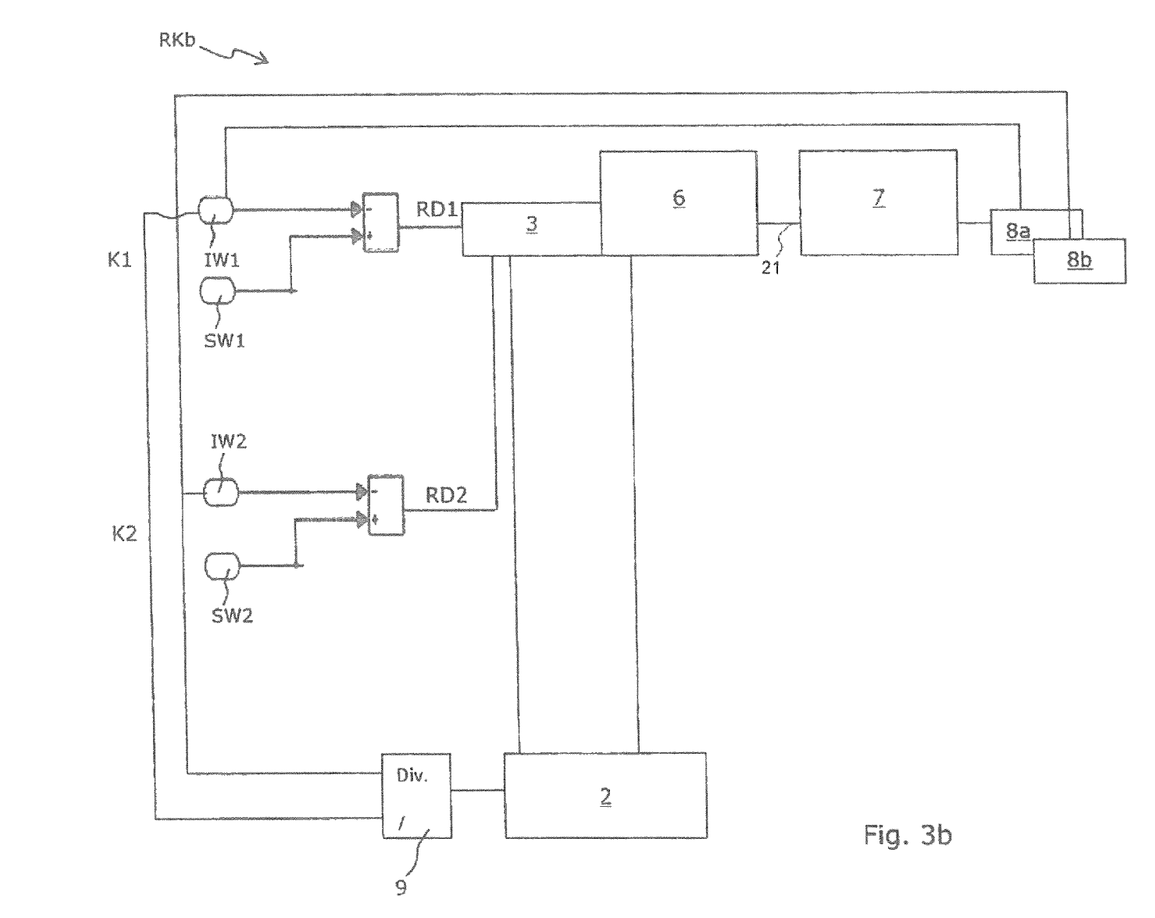
FIG. 3b is a control circuit with two control channels with adaptive amplification.

FIGS. 3a, 3b show control circuits RKa, RKb in each case with two control channels K1, K2, wherein two actual values IW1, IW2 of two control variables are influenced via the single adjustment value 21. For the sake of visual clarity, only the comparison device 2 and the control-difference multiplexer 3 of the channel selection region 1 have been shown in FIGS. 3a, 3b. The control difference of the selected channel is connected by the control-difference multiplexer device 3 to the downstream controller 6, which controls the control loop 7. At the output of the control loop 7, the actual values IW1, IW2 of the control variables are measured by means of measuring devices 8a, 8b and supplied once again to the control circuit RKa, RKb.

In the case of the control circuit RKa shown in FIG. 3a, if the selected channel is switched over by the comparison device 2, for example, from control channel K2 to control channel K1, the control amplification initially remains constant. This leads to different settling times of the individual control channels K1, K2. In order to prevent this, and in particular, in order to accelerate the settling times, the amplification of the control difference RD1, RD2 can be updated in an adaptive manner dependent upon the selected control channel K1, K2. FIG. 3b shows the principle of an adaptive control which can be combined with the control method according to the invention. In the following, it is assumed that the actual value IW1 of the control variable of the first control channel K1 in the control loop 7 is directly influenced by the adjustment value 21, whereas the actual value IW2 of the control variable of the second control channel K2 in the control loop 7 is, in fact, also influenced by the adjustment value 21, but is also exposed to other influencing variables, for example, unpredictable changes of the load. Furthermore, it is assumed that the second control channel K2 has been determined as the selected control channel. The actual value of the first control variable (here IW1) and the actual value of the second control variable (here IW2) of the selected control channel (here K2) are supplied to a further dividing element 9. The dividing element 9 determines an amplification factor IW (first control variable)
IW (second control variable)

by dividing the actual value of the channel of the first control variable by the actual value of the selected control channel. Now either the selected control difference 23 can be influenced, especially multiplied, or the control amplification itself can be influenced, especially multiplied, or the adjustment value 21 can be influenced, especially multiplied, in each case by the amplification factor. A combination of influences or multiplications is also possible.

Figure 4A:
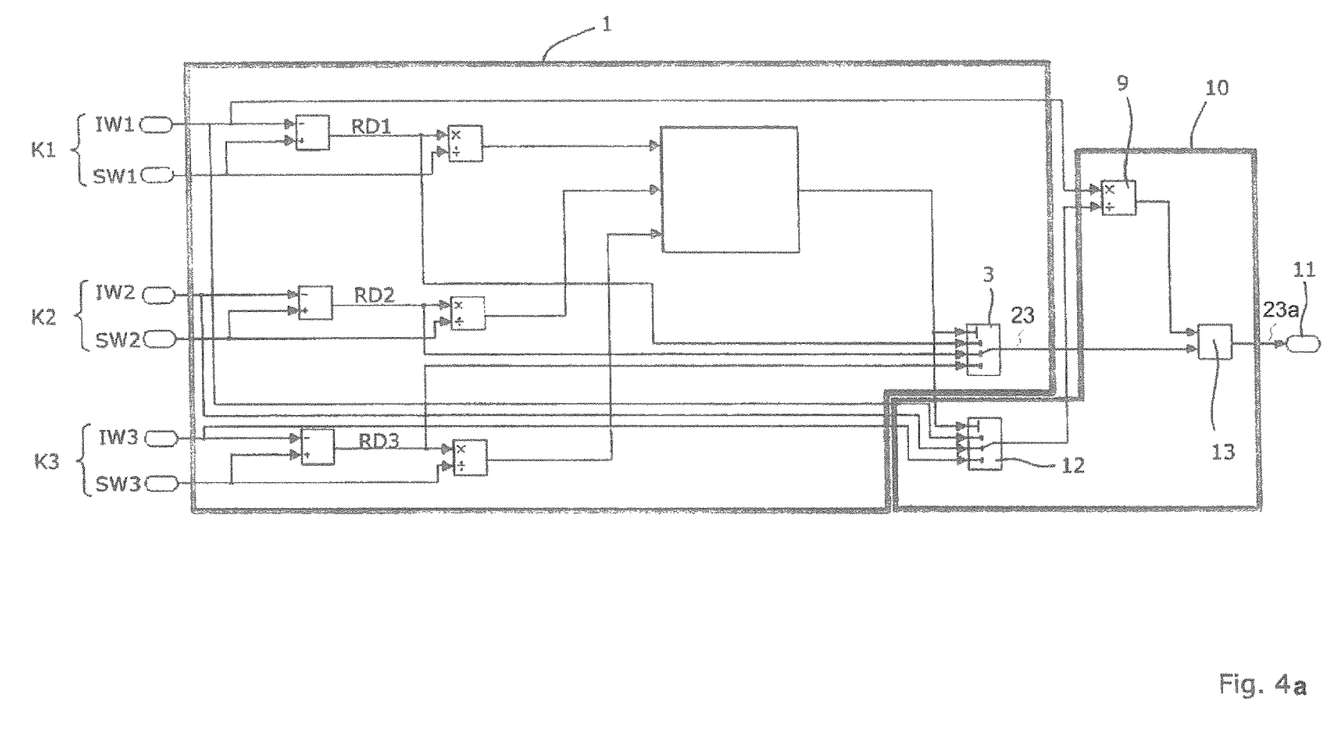
FIG. 4a and FIG. 4b are in each case, a detail of a control circuit according to an embodiments of the invention with channel selection region for the selection of the active control channel via a normalized selection variable and a further region for adaptation of the controller amplification.

FIG. 4a shows a detail of a control circuit according to the invention with the channel selection region 1 shown in FIG. 1 and a further region 10 for the adaptation of the control amplification according to FIG. 3b, so that the previously described channel selection via normalized selection variables and the adaptive controller amplification are combined. The channel selection is implemented on the basis of the control differences NRD1, NRD2, NRD3 normalized to the associated target values SW1, SW2, SW3 in the comparison device 2 (minimum-finder). The selected channel (here the second control channel K2) serves as the drive for the control difference multiplexer 3, which chooses which of the control differences RD1, RD2, RD3 is supplied to the output 11, and which variable is used for the calculation of the adaptive controller amplification. The actual value of the control variable (here IW1) influenced directly by the adjustment value in the control loop is communicated directly to the further dividing element 9. The actual value of the selected channel (here K2) is supplied to the further dividing element 9 via an actual-value multiplexer 12. The further dividing element 9 determines the amplification factor as described above. By means of a multiplication element 13, the selected control difference 23 of the selected control channel (here K2) is multiplied by the amplification factor to form a matched control difference 23a, so that the same amplification and accordingly the same settling time is also obtained for every control channel K1, K2, K3 for the same control difference RD1, RD2, RD3. Before it is supplied to the multiplication element 13, the amplification factor can be multiplied, divided, subtracted, added or otherwise varied with a specified or variable value in order to influence the influence of the amplification factor. The matched control difference 23a is supplied to a controller which is not illustrated in FIG. 4a.

An adaptation of the control amplification can be used advantageously, for example, in the case of a process power supply. In that context, target values for the forward power, the reverse power and the power at load are specified (see above). If the reverse power is to be controlled, this is realized via a change of the forward power. In such a system, the forward power is the power which is controlled directly through the adjustment value. The power at load is also controlled via the change of the forward power. However, the power at load is also influenced by the load itself. This means that an increase of the forward power generally also leads to an increase of the power at load, but not necessarily by the same value as the increase in the forward power, because, dependent upon the impedance of the load, a part of the forward power may not be absorbed by the load and is reflected as reflected power to the process power supply. In the following, a control of the reverse power will be considered; the control of the power at load is implemented in an analogous manner. If ⅕ of the forward power is reflected as reverse power and if the reverse power is to be controlled (control variable=reverse power), the amount by which the reverse power is amplified is reduced to ⅕ with reference to the amount by which the forward power is increased. This difference is compensated according to the invention by multiplying the control amplification by five. This means that, in the case of a control with regard to the reverse power, the control circuit provides the same time behavior as the control with regard to the forward power.

In the example shown in FIG. 4a, only a single further dividing element 9 is used to determine the controller amplification by selecting the input signal (actual value of the selected channel) via the actual value multiplexer 12. However, it is also conceivable to do without the actual value multiplexer 12 and, instead, to implement several further dividing elements 9 in parallel and to select the amplification factor via an amplification factor multiplexer (not shown). This is particularly meaningful if the delay time of the division is so large that it can represent a problem in the context of switching over the actual value multiplexer 12.

Figure 4B:
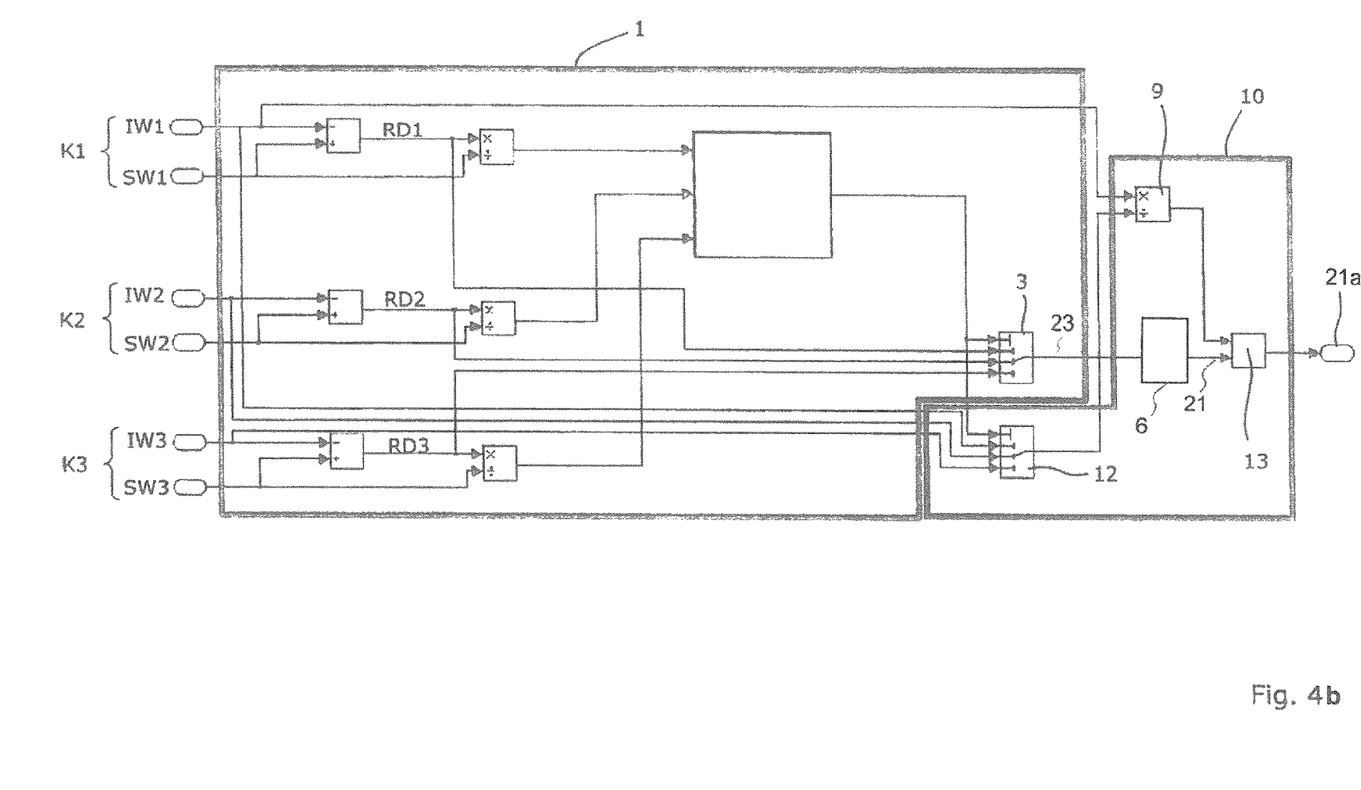

The exemplary embodiment shown in FIG. 4b differs from the exemplary embodiment shown in FIG. 4a in that the multiplication element 13 is arranged downstream of the controller 6. Accordingly, by contrast with the exemplary embodiment shown in FIG. 4a, it is not the selected control difference 23 which is multiplied by the amplification factor but the adjustment value 21. In this manner, a matched adjustment value 21a is generated, which is supplied to the control loop (not shown in FIG. 4b).

A Field Programmable Gate Array (FPGA) or a digital signal processor (DSP) can be used as the controller 6. For example, in determining the actual values, nonlinearities may occur through the choice of measuring devices (detectors) and/or through the conversion of voltage values to form power values. These nonlinearities can be linearized using appropriate means. With the use of a DSP as the controller, this can be implemented in the DSP. The normalization and channel selection can also take place within the DSP. The further dividing element 9, the multiplication element 13 and the actual-value multiplexer 12 can also be realized in the DSP.

If an FPGA is used instead of the DSP, the settling time can be further accelerated.

Figure 5:
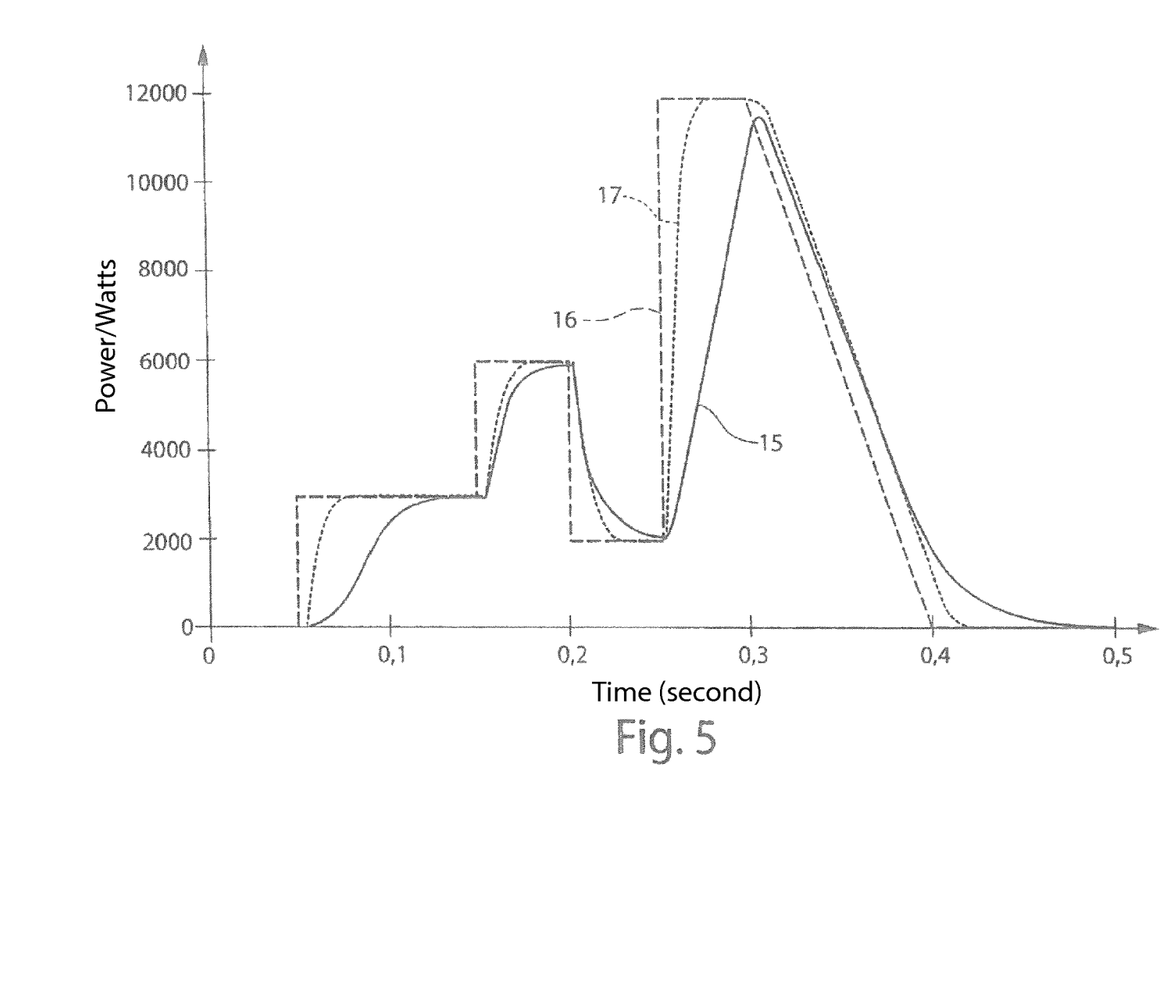
FIG. 5 is a diagram with a simulated characteristic of the output power of a process power supply with a method according to the prior art using a DSP controller, and a control via a method according to an embodiment of the invention using an FPGA controller.

FIG. 5 shows a comparison of the reaction to target-value jumps (dashed line 16) of a conventional control circuit (continuous line 15) with that of a control circuit according to the invention with normalized channel selection (dotted line 17). It is evident that a relatively shorter settling time of the controller is achieved with the use of the normalized channel selection. This is noticeable primarily in the case of the target-value jump to 12 kW with a reduction in the settling time from approximately 50-100 ms to 10-20 ms, that is, by a factor of 2.5-10. While the control circuit according to the invention reaches the target value and holds until the next target-value jump, with the conventional controller, the target value in the control circuit is not reached before the next switchover of the target value takes place.

The performance of a control circuit is improved by embodiments of the present invention: in particular, the channel selection is improved in that, according to the embodiments of the invention, the decision is made on the basis of a normalized selection variable rather than on the basis of an absolute selection variable. Implementing this measure, also allows the controller amplification to be selected in an adaptive manner dependent upon the active control channel, so that the settling time is identical in all control channels. The method according to the invention allows the performance of a control circuit to be predicted in an improved manner and accordingly simplifies an application of the control circuit in a higher order system, for example, a plasma-coating process (PECVD). Moreover, the control circuit is accelerated.

A number of embodiments of the invention have been described. Nevertheless, it will be understood that various modifications may be made without departing from the spirit and scope of the invention. Accordingly, other embodiments are within the scope of the following claims.

What is claimed is:

1. A method for controlling a control loop for controlling a power of a process power supply, via a control circuit with a controller and a plurality of control channels, wherein each control channel comprises an actual value and a target value of a control variable, wherein the plurality of control channels represent actual and target values for at least two variables selected from a group of variables comprising: forward power, reverse power, and power at a load, respectively, the method comprising:
specifying the target values of the control variables;
determining the actual values of the control variables;
determining a selected control channel from the plurality of control channels based on a selection variable dependent upon the actual values;
determining a selected control difference from a target value and an actual value of the selected control channel;
controlling the control loop and each control channel with the selected control difference of the selected control channel; and
controlling the power supply with the control loop,
wherein the selection variable is normalized for at least one of the control channels to the target value of the corresponding control channel to form a normalized selection variable and wherein determining the selected control channel comprises determining the selected control channel from the plurality of control channels on the basis of a comparison of the normalized selection variable with at least one further similar normalized variable of one of the other control channels.

2. The method according to claim 1, wherein the normalization is implemented by dividing the selection variable by the target value of the corresponding control channel.

3. The method according to claim 1, wherein the normalized selection variable is determined for at least two control channels, and wherein the control channel with the maximal or minimal normalized selection variable is determined as the selected channel.

4. The method according to claim 3, characterized in that the control difference serves as the selection variable, and the determination of the selected control channel is implemented by determining the smallest normalized control difference.

5. The method according to claim 3, characterized in that the actual value serves as the selection variable, and the determination of the selected control channel is implemented by determining the largest normalized actual value.

6. The method according to claim 1, wherein the forward power, the reverse power and the power delivered to a load of a process power supply serve as control variables.

7. The method according to claim 1, wherein a Field Programmable Gate Array (FPGA) is used as controller.

8. The method according to claim 1, wherein all control variables are influenced via a single adjustment value.

9. The method according to claim 1, wherein different matched control amplifications are provided for different control channels, wherein the matched controller amplifications for the individual control channels are selected in such a manner that all channels comprise the same settling time.

10. The method according to claim 1, wherein the controller amplification and/or the adjustment value and/or the selected control difference is multiplied by a corresponding amplification factor.

11. The method according to claim 10, wherein the amplification factor is determined by dividing the actual value of a first control variable by the actual value of the control variable of the selected control channel.

12. The method according to claim 10, wherein at least one further matched amplification factor is approximated.

13. The method according to claim 10, wherein the measurement of the actual values and determination of at least one amplification factor is implemented continuously.

14. A control circuit apparatus comprising:
a control loop for controlling the power of a process power supply,
a plurality of control channels, wherein each control channel comprises an actual value and a target value of a control variable, wherein the plurality of control channels represent actual and target values for at least two variables selected from a group of variables comprising: forward power, reverse power, and power at a load, respectively; and
a processor system configured to control the control loop for controlling the power of the process power supply, the processor system configured to control the control loop by:
specifying the target values of the control variables,
determining the actual values of the control variables,
determining a selected control channel from the plurality of control channels based on a selection variable dependent upon the actual values,
determining a selected control difference from a target value and an actual value of the selected control channel,
controlling the control loop and each control channel with the selected control difference of the selected control channel, and
controlling the power supply with the control loop,
wherein the selection variable is normalized for at least one control channel of the plurality of control channels to a target value of the at least one control channel to form a normalized selection variable and wherein determining the selected control channel includes determining the selected control channel from the plurality of control channels on the basis of a comparison of the normalized selection variable with at least one further similar normalized variable of one of the other control channels.

15. The control circuit apparatus according to claim 14, wherein each control channel comprises an adding element which is designed to determine a control difference from the actual value and target value of the control channel.

16. The control circuit apparatus according to claim 14, wherein each control channel comprises a dividing element which is designed to determine a normalized control difference from the actual value and target value of the control channel.

17. The control circuit apparatus according to claim 14, wherein the processor system is configured to designed to determine a control channel as the selected control channel by comparing several normalized control differences.

18. The control circuit apparatus according to claim 14, wherein the processor system is configured to drive a multiplexer device which, for its part, is designed to supply the control difference of the selected control channel to a controller.

19. The control circuit apparatus according to claim 14, wherein the control circuit further comprises a dividing element which is designed to determine an amplification factor from two actual values by division.

20. The control circuit apparatus according to claim 14, wherein the control circuit further comprises a multiplication element which is designed to multiply the amplification factor by an adjustment value determined by the controller and/or a control difference, especially the selected control difference.

21. The control circuit apparatus according to claim 14, wherein the control circuit further comprises a PI controller.

22. The control circuit apparatus according to claim 14, wherein the control circuit further comprises a controller which is embodied as a Field Programmable Gate Array (FPGA).

* * * * *